(12) United States Patent
Russo

(10) Patent No.: US 9,759,180 B2
(45) Date of Patent: Sep. 12, 2017

(54) WATERFALL APPARATUS

(71) Applicant: Richard Charles Russo, Abbeville, LA (US)

(72) Inventor: Richard Charles Russo, Abbeville, LA (US)

(*) Notice: Subject to any disclaimer, the term of this patent is extended or adjusted under 35 U.S.C. 154(b) by 315 days.

(21) Appl. No.: 14/511,981

(22) Filed: Oct. 10, 2014

(65) Prior Publication Data
US 2016/0102650 A1 Apr. 14, 2016

Related U.S. Application Data

(60) Provisional application No. 61/961,401, filed on Oct. 15, 2013.

(51) Int. Cl.
| | | |
|---|---|---|
| *F03B 13/26* | (2006.01) | |
| *F03B 7/00* | (2006.01) | |
| *F04D 13/04* | (2006.01) | |
| *F04D 3/02* | (2006.01) | |

(52) U.S. Cl.
CPC .............. *F03B 13/264* (2013.01); *F03B 7/00* (2013.01); *F04D 3/02* (2013.01); *F04D 13/04* (2013.01); *F05B 2240/93* (2013.01); *Y02E 10/223* (2013.01); *Y02E 10/28* (2013.01); *Y02E 10/38* (2013.01)

(58) Field of Classification Search
CPC ........... F03B 3/04; F03B 13/26–13/264; F03B 13/268; F03B 17/061; F04D 3/02; F04D 13/04; Y02E 10/28; Y02E 10/223

USPC ..... 415/3.1–4.1, 4.3, 6, 71–73, 75; 417/330, 417/331, 334, 336; 290/53; 416/41, 416/197 A
See application file for complete search history.

(56) References Cited

U.S. PATENT DOCUMENTS

| | | | | |
|---|---|---|---|---|
| 697,317 | A * | 4/1902 | Brian ...................... | F04B 19/14 198/702 |
| 1,132,775 | A * | 3/1915 | Hille ........................ | F04D 3/02 415/124.1 |
| 1,345,655 | A * | 7/1920 | Wood ....................... | F04D 3/00 405/39 |
| 1,893,433 | A * | 1/1933 | Muirhead ................ | F04D 3/02 415/124 |
| 2,184,496 | A * | 12/1939 | Hale ........................ | F04D 3/00 415/72 |
| 2,744,465 | A * | 5/1956 | Springer .................. | F04D 3/02 415/111 |
| 3,464,360 | A * | 9/1969 | Jellesma ................. | F04B 19/12 198/673 |
| 3,807,890 | A * | 4/1974 | Wright ................... | F03B 17/063 415/27 |
| 4,163,636 | A * | 8/1979 | Botsch .................... | F04B 19/10 198/716 |
| 4,170,436 | A * | 10/1979 | Candler ................... | F04D 3/02 415/73 |
| 4,239,449 | A * | 12/1980 | Bauer ..................... | F04D 3/02 415/73 |
| 4,280,789 | A * | 7/1981 | Graden .................. | F03B 13/00 415/6 |

(Continued)

*Primary Examiner* — Alexander Comley

(57) ABSTRACT

A rotary pump that utilizes falling water to produce useful energy. The pump is a conduit in a spiral form mounted on an axis that is set at an angle whereby when rotated, water flows into the inlet end of the conduit and is transported to an elevation. The conduit is powered by an impeller wheel that rotates by falling water.

11 Claims, 3 Drawing Sheets

(56) References Cited

U.S. PATENT DOCUMENTS

| | | | | | |
|---|---|---|---|---|---|
| 4,813,849 | A | * | 3/1989 | Grujanac | F04D 3/02 261/86 |
| 4,816,697 | A | * | 3/1989 | Nalbandyan | F03B 3/04 290/43 |
| 4,830,585 | A | * | 5/1989 | Ruyle | A01C 3/026 415/66 |
| 4,948,985 | A | * | 8/1990 | Adams | F03B 1/00 290/54 |
| 5,071,314 | A | * | 12/1991 | Jacobsen | A01K 79/00 415/148 |
| 5,073,082 | A | * | 12/1991 | Radlik | F04B 19/12 198/673 |
| 5,366,341 | A | * | 11/1994 | Marino | F03B 13/1815 415/3.1 |
| 5,440,175 | A | * | 8/1995 | Mayo, Jr. | F03B 7/003 290/53 |
| 5,947,678 | A | * | 9/1999 | Bergstein | F03B 3/00 415/202 |
| 6,083,382 | A | * | 7/2000 | Bird | B01D 61/06 210/143 |
| 6,206,630 | B1 | * | 3/2001 | Feltenberger | F03B 7/003 290/54 |
| 7,918,087 | B1 | * | 4/2011 | Brown | F03B 7/006 60/398 |
| 8,643,206 | B2 | * | 2/2014 | Ekern | F03B 13/06 290/52 |
| 2007/0065272 | A1 | * | 3/2007 | Maple | F03B 17/005 415/3.1 |
| 2012/0117960 | A1 | * | 5/2012 | Browne | F03B 13/183 60/495 |
| 2012/0201664 | A1 | * | 8/2012 | McCants | F03B 7/00 415/202 |

* cited by examiner

WATERFALL APPARATUS

CROSS-REFERENCE TO RELATED APPLICATIONS

This application claims the benefit of provisional patent application Ser. No. U.S. 61/961,401, filed 2013 Oct. 15 by the present inventor.

BACKGROUND—PRIOR ART

The following is a tabulation of some prior art that presently appears relevant:

U.S. Patents

| Patent Number | Kind Code | Issue Date | Patentee |
|---|---|---|---|
| 3,986,787 | A | 1976 Oct. 19 | Mouton |
| 4,717,831 | A | 1988 Jan. 5 | Kikuchi |
| 5,366,341 | A | 1994 Nov. 22 | Marino |
| 7,075,190 | B1 | 2006 Jul. 11 | Lomerson |
| 7,200,879 | B2 | 2007 Apr. 10 | Li |
| 7,378,750 | B2 | 2008 May 27 | Williams |
| 7,492,054 | B2 | 2009 Feb. 17 | Catlin |
| 7,999,444 | B2 | 2011 Aug. 16 | Sunaga |
| 8,002,974 | B2 | 2011 Aug. 23 | Noling |
| 8,080,893 | B2 | 2011 Dec. 20 | Lin |
| 8,102,071 | B2 | 2012 Jan. 24 | Catlin |
| 20140165712 | A1 | 2014 Jun. 19 | Zeng |

This invention relates to forces of nature being transformed by rotary motion into energy that can be readily available for consumption. Much of the energy consumed by entities require hydrocarbon fossil fuel sources. Utilizing these fuels emit elements into the environment that have created an alert that requires the reduction of these fuel emissions. Accordingly, the nonrenewable nature of these fuels has guided industry and public opinion that the field of technology is to seek alternative sources. The search of prior art has revealed this activity in the field of technology.

SUMMARY

It is the object of this invention to provide useful energy by utilizing multiple forces of nature simultaneously or separately. This invention accumulates each of these forces as they are available by transporting a portion of the water they influence into a central containment area. A series of mechanical parts jointly fitted together in synchronized motion is the method by which it functions.

Figure 1:
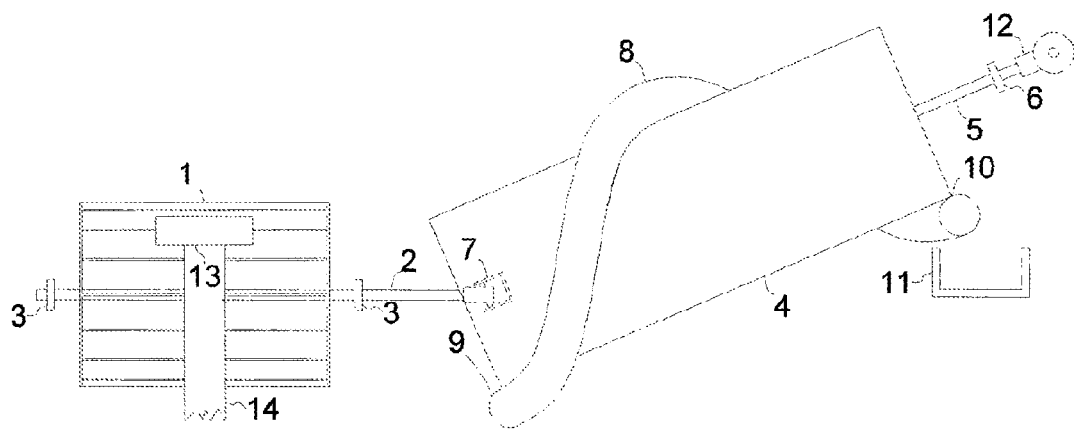
FIG. 1 is a front view of the impeller wheel connected to the spiral elongated screw pump with the gimbal and dispersion tray.

Drawings-Reference Numerals 1 impeller wheel
2 horizontal shaft
3 bearings
4 spiral elongated screw pump cylinder
5 center shaft
6 upper bearing
7 gimbal
8 spiral conduit
9 lower end
10 upper end
11 U shape reservoir channel
12 anti-reverse brake pivot system
13 dispersion tray
14 inlet conduit
15 partition
16 buoyancy devices
17 flexible conduit
18 water level
19 rises
20 embankment
21 reservoir
22 rise

DETAILED DESCRIPTION OF THE INVENTION

There are no structural supports illustrated in this detailed description. In FIG. 1 the impeller wheel 1 is on the horizontal shaft 2 supported by the two bearings 3. The spiral elongated screw pump cylinder 4 center shaft 5 that extends toward both ends, further at the upper end, of the spiral elongated screw pump cylinder 4 and set at an angle by the upper bearing 6 is attached to the impeller wheel horizontal shaft 2 by the gimbal 7 that is housed inside the lower end of the spiral elongated screw pump cylinder 4. The spiral conduit 8 begins at the edge of the lower end 9 of the spiral elongated screw pump cylinder 4 and spirals around the outside one revolution in equal form to the edge of the upper end 10 of the spiral elongated screw pump cylinder 4. The upper edge of the U shape containment area channel 11 is located immediately, without contact, beneath the upper end of the spiral conduit 8. The lower edge of the U shape reservoir channel 11 is sufficiently above the elevation of the center of the impeller wheel horizontal shaft 2. The anti-reverse brake pivot system 12 is attached to the upper end of the spiral elongated screw pump cylinder 4 center shaft 5. The dispersion tray 13 is specifically located immediately, without contact, at the outer edge of the impeller wheel 1 between the impeller wheel 1 sides above the horizontal shaft 2 and below the top of the impeller wheel 1 and is attached to the upper end of the inlet conduit 14.

Figure 2:
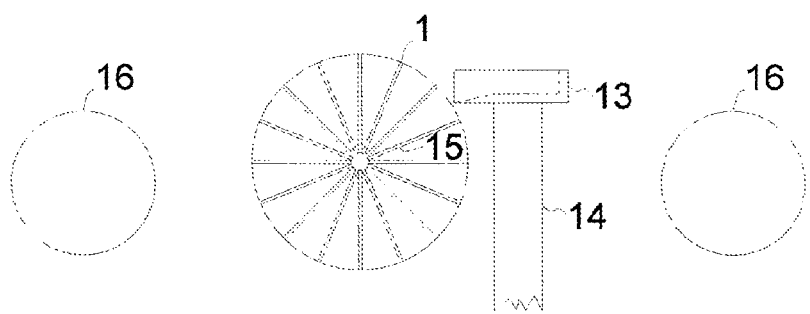
FIG. 2 is a side view of the impeller wheel, dispersion tray, inlet conduit, and buoyancy devices.
Figure 3:
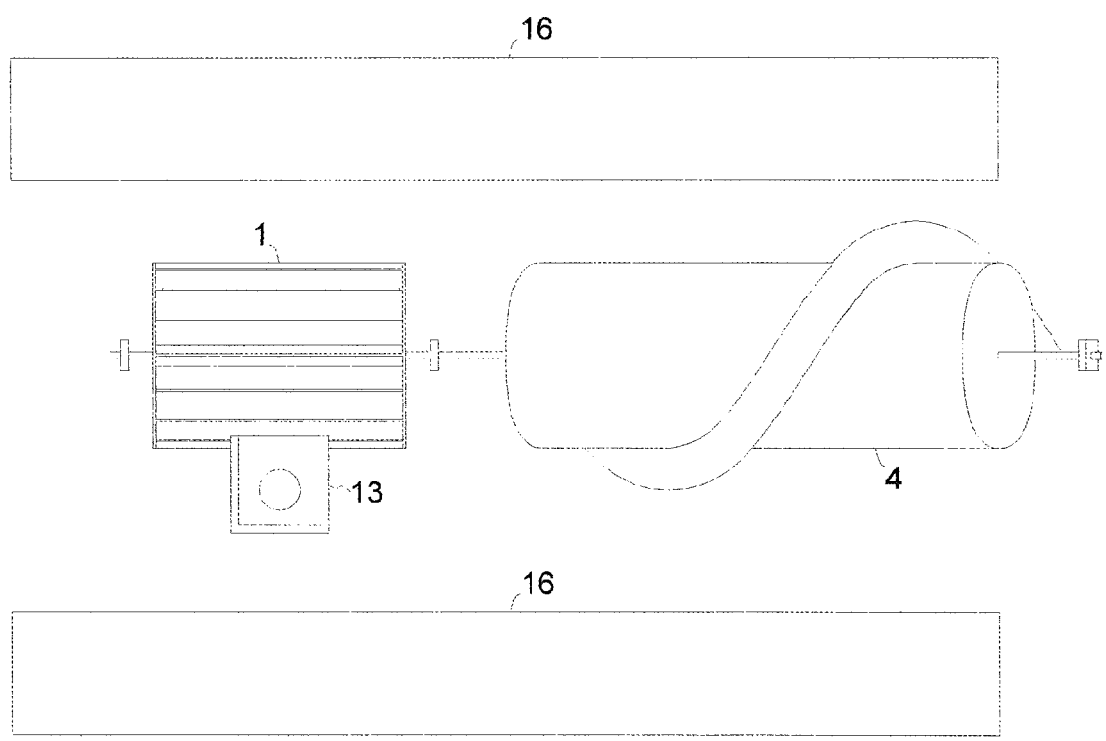
FIG. 3 is a top view of the impeller wheel, dispersion tray, spiral elongated screw pump cylinder and buoyancy devices.
Figure 4:
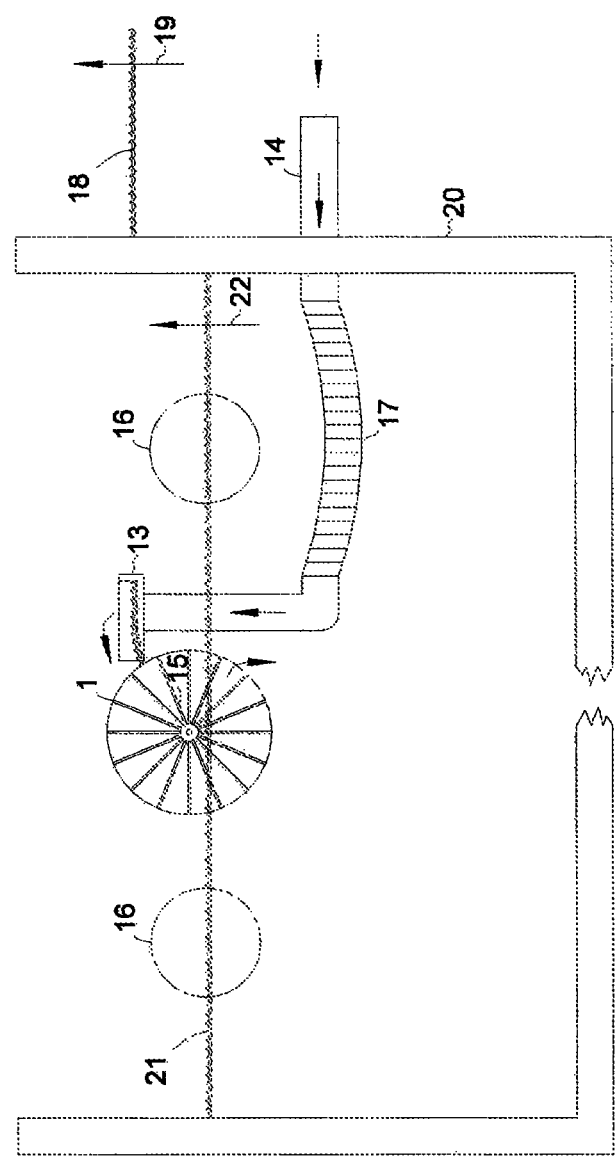
FIG. 4 is a side view of the impeller wheel, dispersion tray, conduit and buoyancy devices in a reservoir.

In FIG. 2 each partition 15, equally spaced with the other is set perpendicular between the sides of the impeller wheel 1 beginning less than flush, not illustrated here, with the circumference edge of the impeller wheel 1 sides and extend to the impeller wheel horizontal shaft 2 in FIG. 1. In FIG. 4 the impeller wheel 1, dispersion tray 13, inlet conduit 14, flexible conduit 17 and the buoyancy devices 16 are specifically located in a buoyancy system.

In FIG. 4, as the water level 18 rises 19 caused by the tide, precipitation, waves, surge and other means being controlled by an embankment 20, it is allowed to flow into the inlet conduit 14 through the embankment 20 and into a reservoir 21. The arrows in FIG. 4 illustrate the direction of the flow of water during the operation of the waterfall apparatus. The gravity influenced water flows into the inlet conduit 14 and out of the dispersion tray 13 causing the impeller wheel 1 to rotate by the weight of the water that collects between each corresponding partition 15 thus rotating the spiral elongated screw pump cylinder 4 and the spiral conduit 8 in FIG. 1. The lower end of the spiral conduit 8 captures a measured amount of water from the reservoir 21 in FIG. 4. The captured water is elevated to the upper end 10 of the spiral conduit 8 in FIG. 1 by the rotation and allows it to flow into the U shape containment area channel 11.

As the impeller wheel 1 in FIG. 4 rotates, the water flows from between each corresponding partition 15 into the reservoir 21 causing the water level in the reservoir 21 to rise 22. The flexible conduit 17 allows the buoyancy devices 16 to float on the surface of the reservoir 21 in a stable form, keeping the impeller wheel horizontal shaft 2 in FIG. 1 and the dispersion tray 13 in FIG. 4 at a specified distance above the reservoir 21 water surface as the level rises. The spiral elongated screw pump cylinder 4 center shaft 5 in FIG. 1 pivots at the anti-reverse brake pivot system 12 enabling the buoyancy devices 16 in FIG. 4 to float on the surface of the reservoir 21 in a stable form as the water level rises. The brake in the anti-reverse brake pivot system 12 in FIG. 1 functions as a ratchet allowing the spiral elongated screw pump cylinder 4 center shaft 5 to rotate in one direction, preventing the gravitational force of the water in the spiral conduit 8 to rotate it in the opposite direction.

In FIG. 2 the design and number of partitions 15 are determined by the required function. The less than flush, not illustrated here, short distance from the outer edge of the partition 15 in FIG. 4 and the circumference edge of the impeller wheel 1 sides in FIG. 1 is sufficient to prevent the water from overtopping the sides as it flows from the dispersion tray 13, then horizontally in both directions along the impeller wheel horizontal shaft 2 and impacts the impeller wheel 1 sides. The dispersion tray 13 is located as to rotate the spiral conduit 8 in the direction that elevates the captured water. The elevation of the U shape containment area channel 11 is increased by the diameter, length or angle of the spiral elongated screw pump cylinder 4. The length determines multiple revolutions of the spiral conduit 8 around the outside. Increasing the impeller wheel 1 accordingly, provides the necessary force to implement the correct balance at the gimbal 7 to rotate the spiral elongated screw pump cylinder 4.

The impeller wheel horizontal shaft 2 and dispersion tray 13 in FIG. 1 is set at a minimum distance above the reservoir 21 water surface in FIG. 4 to minimize the head of the two water levels. The water is released, when necessary, from the reservoir 21 through a conduit equipped with a one-way flow system, not illustrated.

In FIG. 1 the water in the containment area, which is not illustrated here, that is derived from the U shape containment area channel 11 is released in a timely manner to produce useful energy.

I claim:

1. A waterfall apparatus, the apparatus comprising an impeller wheel disposed on a horizontal shaft that is supported by buoyancy devices, the horizontal shaft being connected by a gimbal to the lower end of a spiral elongated screw pump disposed on an angled shaft, the apparatus being disposed within the confines of an embankment through which a conduit passes, the conduit allowing water which is elevated by the tide to flow into a dispersion tray that disperses the water such that it falls into the side of the impeller wheel, thereby causing the impeller wheel to rotate, wherein an anti-reverse brake pivot system disposed at the upper end of the spiral elongated screw pump prevents the angled shaft from rotating in a reverse direction, wherein as the impeller wheel rotates, water below the buoyancy devices flows into the lower end of the spiral elongated screw pump, flows out the upper end of the spiral elongated screw pump into a reservoir channel, and wherein the water is transported and ultimately falls to produce useful energy.

2. The waterfall apparatus of claim 1, wherein said impeller wheel is rotated after water is elevated by action of precipitation to a level that it flows into said impeller wheel.

3. The waterfall apparatus of claim 1, wherein said impeller wheel is rotated after water is elevated by action of a wave force to a level that it flows into said impeller wheel.

4. The waterfall apparatus of claim 1, wherein said impeller wheel is rotated after water is elevated by action of a surge of energy to a level that it flows into said impeller wheel.

5. The waterfall apparatus of claim 1, wherein said impeller wheel is rotated after water is elevated by action of a solar cell system, to a level that it flows into said impeller wheel.

6. The waterfall apparatus of claim 1, wherein said impeller wheel is rotated after water is elevated by action of a wind capture system, to a level that it flows into said impeller wheel.

7. The waterfall apparatus of claim 1, wherein said impeller wheel is rotated after water is elevated by motion created by human activity to a level that it flows into said impeller wheel.

8. The waterfall apparatus of claim 1, wherein said impeller wheel is rotated after water is elevated by motion created by animal activity to a level that it flows into said impeller wheel.

9. The waterfall apparatus of claim 1, wherein said impeller wheel is rotated after water is elevated by action of geothermal energy to a level that it flows into said impeller wheel.

10. The waterfall apparatus of claim 1, wherein said impeller wheel is rotated after water is elevated by action of temperature variation to a level that it flows into said impeller wheel.

11. The waterfall apparatus of claim 1, wherein said impeller wheel is rotated after water is elevated by action of barometric atmospheric pressure to a level that it flows into said impeller wheel.

* * * * *